United States Patent
Lovelock et al.

(10) Patent No.: US 10,129,248 B2
(45) Date of Patent: Nov. 13, 2018

(54) ONE-TIME-PASSWORD GENERATED ON READER DEVICE USING KEY READ FROM PERSONAL SECURITY DEVICE

(71) Applicant: Assa Abloy AB, Stockholm (SE)

(72) Inventors: Julian Eric Lovelock, Pleasanton, CA (US); Philip Hoyer, Richmond (GB)

(73) Assignee: Assa Abloy AB, Stockholm (SE)

( * ) Notice: Subject to any disclaimer, the term of this patent is extended or adjusted under 35 U.S.C. 154(b) by 138 days.

(21) Appl. No.: 14/902,859

(22) PCT Filed: Jun. 19, 2014

(86) PCT No.: PCT/IB2014/002137
§ 371 (c)(1),
(2) Date: Jan. 5, 2016

(87) PCT Pub. No.: WO2015/004528
PCT Pub. Date: Jan. 15, 2015

(65) Prior Publication Data
US 2016/0156619 A1    Jun. 2, 2016

Related U.S. Application Data

(60) Provisional application No. 61/843,572, filed on Jul. 8, 2013.

(51) Int. Cl.
*H04L 29/06*    (2006.01)
*G06F 21/35*    (2013.01)
(Continued)

(52) U.S. Cl.
CPC .......... *H04L 63/0838* (2013.01); *G06F 21/34* (2013.01); *G06F 21/35* (2013.01);
(Continued)

(58) Field of Classification Search
CPC ......... G06F 21/34; G06F 21/35; H04L 63/06; H04L 63/0838; H04L 63/10; H04L 9/0863; H04L 9/3234
See application file for complete search history.

(56) References Cited

U.S. PATENT DOCUMENTS

| | | | | |
|---|---|---|---|---|
| 5,058,161 A | * | 10/1991 | Weiss | G06F 7/582 340/10.42 |
| 5,657,388 A | * | 8/1997 | Weiss | G06F 21/34 235/379 |

(Continued)

FOREIGN PATENT DOCUMENTS

| | | |
|---|---|---|
| EP | 1 473 869 A1 | 11/2004 |
| WO | WO 1995/025391 A1 | 9/1995 |

OTHER PUBLICATIONS

Vaidya, Binod, et al. "Robust one-time password authentication scheme using smart card for home network environment." Computer Communications 34.3 (2011): 326-336.*

(Continued)

*Primary Examiner* — Michael Simitoski
(74) *Attorney, Agent, or Firm* — Muirhead and Saturnelli, LLC

(57) ABSTRACT

An authentication system is provided using one-time passwords (OTPs) for user authentication. An OTP key may be stored on a different device than the device on which the OTP is generated. In an embodiment, the system described herein enables a combined authentication system, including the two separate devices communicating over a non-contact interface, to provide advantageous security features compared to the use of a single device, such as a hardware OTP token. One device may be a personal security device and the other device may be a reader device coupled to a host device via which access is being controlled.

18 Claims, 6 Drawing Sheets

(51) Int. Cl.
  *G06F 21/34*  (2013.01)
  *H04L 9/08*  (2006.01)
  *H04L 9/32*  (2006.01)

(52) U.S. Cl.
  CPC .......... *H04L 9/0863* (2013.01); *H04L 9/3234* (2013.01); *H04L 63/06* (2013.01); *H04L 63/10* (2013.01)

(56) References Cited

U.S. PATENT DOCUMENTS

| | | | | |
|---|---|---|---|---|
| 6,067,621 | A * | 5/2000 | Yu | G06F 21/34 713/168 |
| 7,031,946 | B1 * | 4/2006 | Tamai | G06F 12/1466 705/50 |
| 8,751,827 | B1 * | 6/2014 | Duane | G06F 3/1204 713/159 |
| 9,722,999 | B2 * | 8/2017 | Babbidge | H04L 63/0838 |
| 2005/0050330 | A1 * | 3/2005 | Agam | G06Q 20/341 713/172 |
| 2005/0188202 | A1 * | 8/2005 | Popp | H04L 9/3263 713/175 |
| 2006/0097039 | A1 * | 5/2006 | Begola | G06Q 20/10 235/380 |
| 2007/0029378 | A1 * | 2/2007 | Begola | G06Q 20/204 235/380 |
| 2007/0061566 | A1 * | 3/2007 | Bailey | H04L 9/0866 713/151 |
| 2008/0072303 | A1 * | 3/2008 | Syed | H04L 63/0807 726/10 |
| 2008/0201577 | A1 * | 8/2008 | Tuliani | G06F 21/34 713/168 |
| 2008/0301461 | A1 * | 12/2008 | Coulier | G06F 21/31 713/184 |
| 2009/0193264 | A1 * | 7/2009 | Fedronic | G06F 21/31 713/184 |
| 2010/0149591 | A1 * | 6/2010 | Hase | H04N 1/4413 358/1.15 |
| 2011/0113237 | A1 * | 5/2011 | Hird | G06F 21/34 713/155 |
| 2012/0131655 | A1 * | 5/2012 | Bender | G06F 21/34 726/6 |
| 2013/0233924 | A1 * | 9/2013 | Burns | G06K 7/0021 235/441 |
| 2014/0086412 | A1 * | 3/2014 | Shibata | H04L 9/0656 380/255 |
| 2015/0049925 | A1 * | 2/2015 | Lowe | G06K 19/0718 382/124 |
| 2016/0014116 | A1 * | 1/2016 | Babbidge | G06F 21/41 726/6 |
| 2017/0264602 | A1 * | 9/2017 | Roth | H04L 63/08 |

OTHER PUBLICATIONS

Xu, Jing, Wen-Tao Zhu, and Deng-Guo Feng. "An improved smart card based password authentication scheme with provable security." Computer Standards & Interfaces 31.4 (2009): 723-728.*

* cited by examiner

ONE-TIME-PASSWORD GENERATED ON READER DEVICE USING KEY READ FROM PERSONAL SECURITY DEVICE

RELATED APPLICATIONS

This application claims priority to U.S. Prov. App. No. 61/843,572, filed Jul. 8, 2013, which is incorporated herein by reference.

TECHNICAL FIELD

This application is related to the field of authentication and access control.

BACKGROUND OF THE INVENTION

Personal Security Devices (PSDs) may contain information and/or components that enable secure authentication of a user presenting a PSD to access a secured host device and/or access remote secured services via a host device. PSDs may include, for example, smart cards, tokens hosting a secure chip and/or mobile phones, among other suitable authentication devices. The information and/or components on the PSD may include a security mechanism (SM) that allows the PSD to be used for secure transactions. The PSD may also include applications that facilitate the SM provided by the PSD (e.g., a program to facilitate door access may include a specific door access security mechanism). In some cases, the information and/or components may be downloaded by a manufacturer prior to distribution, while in other cases, information and/or components for managing the PSD may be securely downloaded over a network by the PSD. For detailed discussions of features and operations of personal security devices, reference is made, for example, to U.S. Pat. No. 8,028,083 B2 to Audebert et al., entitled "Method and System for Remote Activation and Management of Personal Security Devices," that discloses features of remote activation and management of PSDs over a network for obtaining services of data from a remote computer system, and to WO 2013/144719 A1 to Sechdeva et al., entitled "Field Revisions for a Personal Security Device," providing disclosure for management and establishment of security mechanisms and key material in issued personal security devices in a field environment, both of which are incorporated herein by reference.

Accordingly, it would be desirable to provide mechanisms and techniques that advantageously enable and facilitate secure access by a personal security device to a secured host device.

SUMMARY OF THE INVENTION

According to the system described herein, a method for access control using a personal security device (PSD) of a user is provided. The method includes providing the PSD with a one-time-password (OTP) key. A reader device, coupled to a host device, is interfaced with the PSD. The reader device is authenticated to the PSD, and in which the OTP key is only readable from the PSD by the reader device when the reader device is authenticated and a secure channel is established between the PSD and a reader device. The OTP key is transferred from the PSD to the reader device over the secure channel. An OTP is generated at the reader device using the OTP key transferred to the reader device from the PSD. The OTP is passed from the reader device to the host device or a validation system connected to the host device for validation. The method may further include validating the OTP and granting access to the user and clearing the OTP key from the reader device. The method may further include sending counter data from the PSD to the reader device, sending counter data or incremented counter data from the reader device to the PSD after an access decision and/or storing counter data on the reader device before or after an access decision. The PSD may be a smart card, a token, a mobile phone and/or a secure memory storage card that has authentication capabilities and no exposed crypto functions beyond memory access authentication. The OTP may be generated at the reader device in a secure environment of the reader device. The PSD may be provided with the OTP key at a time of manufacture of the PSD and/or during a field revision of the PSD. The interfacing of the reader device and the PSD may be via a non-contact interface.

According further to the system described herein, a non-transitory computer readable medium stores software for access control using a personal security device (PSD) of a user. The software includes executable code that stores a one-time-password (OTP) key on the PSD. Executable code is provided that controls interfacing of a reader device, coupled to a host device, with the PSD. Executable code is provided that authenticates the reader device to the PSD, and in which the OTP key is only readable from the PSD by the reader device when the reader device is authenticated and a secure channel is established between the PSD and a reader device. Executable code is provided that transfers the OTP key from the PSD to the reader device over the secure channel. Executable code is provided that generates an OTP at the reader device using the OTP key transferred to the reader device from the PSD. Executable code is provided that passes the OTP from the reader device to the host device or a validation system connected to the host device for validation. Executable code may be provided that validates the OTP and grants access to the user. Executable code may be provided that clears the OTP key from the reader device. Executable code maybe provided that sends counter data from the PSD to the reader device, that sends counter data or incremented counter data from the reader device to the PSD after an access decision, and/or that stores counter data on the reader device before or after an access decision. The PSD may be a smart card, a token, a mobile phone and/or a secure memory storage card that has authentication capabilities and no exposed crypto functions beyond memory access authentication. The OTP may be generated at the reader device in a secure environment of the reader device. The PSD may be provided with the OTP key at a time of manufacture of the PSD and/or during a field revision of the PSD. The interfacing of the reader device and the PSD may be via a non-contact interface.

According further to the system described herein, a system for access control using a personal security device (PSD) of a user includes the PSD and a non-contact field reader device coupled to a host device. At least one processor reads software stored on at least one computer readable medium, the software including executable code that stores a one-time-password (OTP) key on the PSD. Executable code is provided that controls interfacing of a reader device, coupled to a host device, with the PSD. Executable code is provided that authenticates the reader device to the PSD, and in which the OTP key is only readable from the PSD by the reader device when the reader device is authenticated and a secure channel is established between the PSD and a reader device. Executable code is provided that transfers the OTP key from the PSD to the reader device over the secure channel. Executable code is provided that generates an OTP at the reader device using the OTP key transferred to the reader device from the PSD. Executable code is provided that passes the OTP from the reader device to the host device or a validation system connected to the host device for validation. Executable code may be provided that validates the OTP and grants access to the user. Executable code may be provided that clears the OTP key from the reader device. Executable code maybe provided that sends counter data from the PSD to the reader device, that sends counter data or incremented counter data from the reader device to the PSD after an access decision, and/or that stores counter data on the reader device before or after an access decision. The PSD may be a smart card, a token, a mobile phone and/or a secure memory storage card that has authentication capabilities and no exposed crypto functions beyond memory access authentication. The OTP may be generated at the reader device in a secure environment of the reader device. The PSD may be provided with the OTP key at a time of manufacture of the PSD and/or during a field revision of the PSD. The interfacing of the reader device and the PSD may be via a non-contact interface.

BRIEF DESCRIPTION OF THE DRAWINGS

Embodiments of the system are described with reference to the several figures of the drawings, briefly described as follows.

DETAILED DESCRIPTION OF VARIOUS EMBODIMENTS

Figure 1:
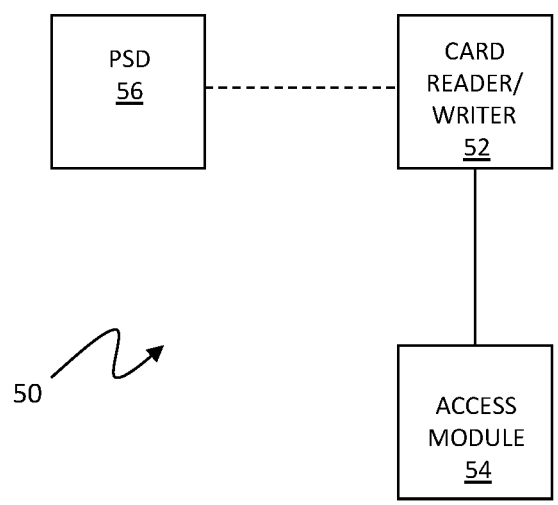
FIG. 1 is a schematic illustration showing a controller, a card reader/writer, and a PSD that may be used in accordance with an embodiment of the system described herein.

FIG. 1 is a schematic illustration of a system 50 having a card reader/writer 52, an access module 54, and a PSD 56. In an embodiment herein, the PSD may be a smart card. However, other types of security tokens may be used instead, including an integrated circuit card, a subscriber identification module (SIM), a wireless identification module (WIM), an identification token, a secure access module (SAM), a hardware security module (HSM), a secure multimedia card (SMMC), a universal serial bus (USB) token, or a similar portable device that may be carried by a user for access. The card reader/writer 52 may be adapted to read from and write to the PSD 56 depending upon how the PSD 56 is implemented.

The access module 54 may be a host device (e.g., a programmed computing device, a specialized microprocessor, etc.) incorporated into a door or door controller for controlling physical access therethrough and/or may be incorporated into desktops, laptops and/or kiosks for controlling logical and/or physical access to another logical and/or physical entity (e.g., a computer file system). In some embodiments, the access module 54 may be used for payment transactions, loyalty transactions (e.g., frequent flyer miles, shopping points, etc.), and/or for any type of protected transaction and/or operation.

In an embodiment, the access module 54 may be capable of establishing a logical communication channel with the PSD 56 and capable of authenticating to the PSD 56. In various embodiments, the access module 54 may be a module of a secured host device and/or may be a module for accessing remote secured services. The card reader/writer 52 may be device capable of establishing a connection with the PSD 56, as further discussed in detail elsewhere herein. In one embodiment, the card reader/writer 52 may establish an NFC connection with the PSD 56, although other types of connections are possible. The card reader/writer 52 may be the same device as, or may be distinct from, the access module 54. The card reader/writer 52 and the access module 54 may be coupled using any appropriate mechanism, such as hard wired, WiFi, via the Internet, a private IP network, and/or any other appropriate mechanism for transmitting data therebetween. In various embodiments, the card reader/writer 52 may be, for example, a universal serial bus (USB) connected device and/or may be implemented in other forms, such as a device embedded in a sleeve for a tablet/phone and/or a device embedded in the host device itself.

The card reader/writer 52 and the access module 54 communicate with the PSD 56 to exchange data therewith, as further described elsewhere herein. In an embodiment herein, a user presents the PSD 56 to the card reader/writer 52 and is granted or denied access based on the results of applying a security mechanism used by the access module 54 and the PSD 56. In some embodiments, both the PSD 56 and the access module 54 have a shared secret which may be used to authenticate the PSD 56. The term "shared secret" may be understood herein to include symmetric keys and session keys in which each side in a transaction may have the same or a different key that is used for secure communication and authentication. In an embodiment herein, establishing a shared secret may be performed by initially using a public key infrastructure (PKI) key agreement technique such as Diffie-Hellman and/or Elliptic Curve Diffie Hellman (ECDH) along with a public/private key pair of the personal security device 56 and a different public/private key pair of the access module 54. Note that any appropriate technique may be used to establish a shared secret between the PSD 56 and the access module 54, such as RSA key transport, which allows the system on one side to generate a shared secret that is involved in the computation of a session key that is transmitted securely using an authenticated public key bound to a private key of the system on the other side. For discussion of techniques for securely exchanging information between a host computer and a cryptographic module, see, for example, U.S. Pat. No. 8,306,228 B2 to Le Saint et al., entitled "Universal Secure Messaging for Cryptographic Modules," which is incorporated by reference herein.

The system described herein may be used in connection with initially using a manufacturer/factory installed security mechanism (SM) to grant access and/or revising the SM and application(s) on the PSD in connection with a use (e.g., the first use). The SM and corresponding application(s) may be modified to be customized SM and corresponding application(s) specifically provided for a specific customer and not generally available to others.

Figure 2:
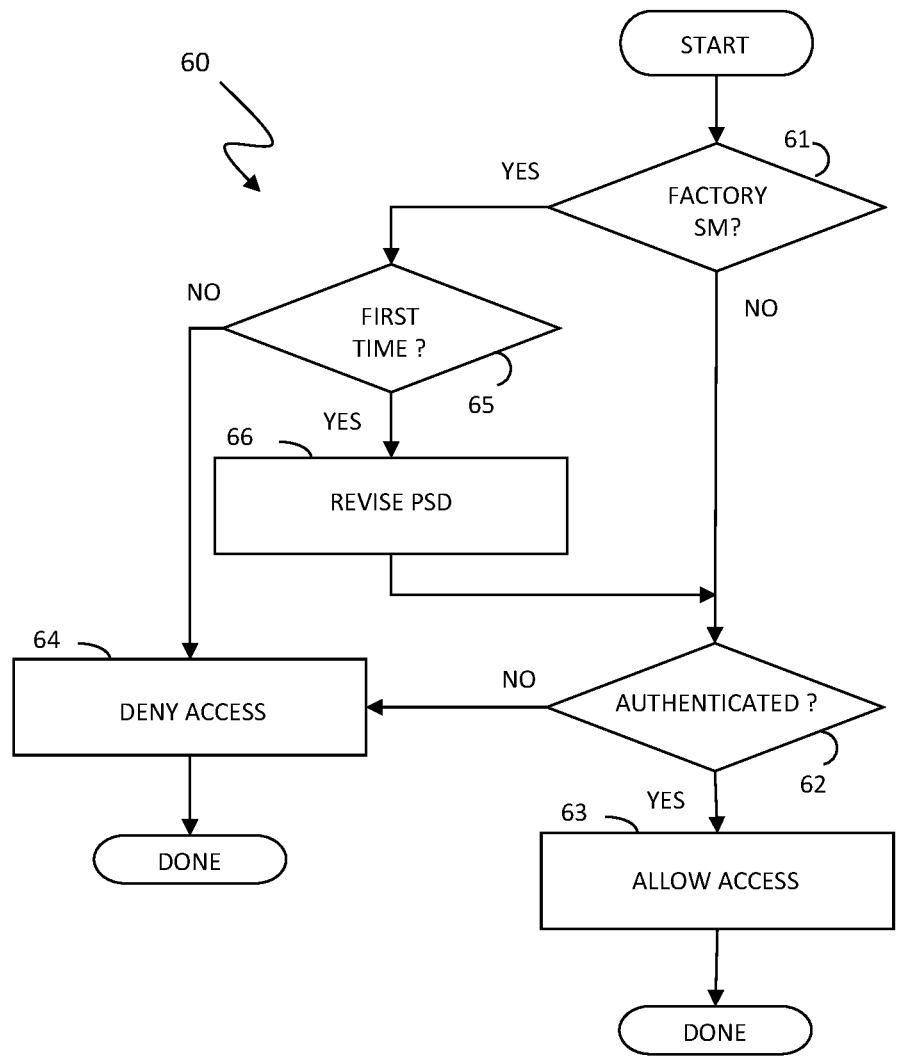
FIG. 2 is a flow diagram illustrating steps performed in connection with authenticating and possibly modifying a PSD according to an embodiment of the system described herein.

FIG. 2 is a flow diagram 60 showing steps performed in connection with the card reader/writer 52 and the access module 54 being presented with the PSD 56 by a user according to the system described herein. Processing begins at a first test step 61 where it is determined if a PSD has a factory SM (i.e., an SM loaded into the PSD by the manufacturer). As discussed elsewhere herein, a customer may receive PSDs with factory SMs and then modify the SMs to be customized customer-specific SMs that may not be generally available to others. If it is determined at the test step 61 that the PSD does not have a factory SM (and thus has a customized SM), then control transfers from the test step 61 to a test step 62 where it is determined if the PSD can be authenticated based on the SM. Specific implementations of an SM are discussed elsewhere herein, including use of a one-time-password (OTP). If the SM is authenticated, then control transfers from the test step 62 to a step 63 where access is allowed. Following the step 63, processing is complete. If it is determined at the test step 62 that the PSD cannot be authenticated based on the SM, then control transfers from the test step 62 to a step 64 where access is denied. Following the step 64, processing is complete.

If it is determined at the test step 61 that the PSD contains a factory SM, then control transfers from the test step 61 to a test step 65 where it is determined if it is the first time that the PSD 56 has been presented to the access module 54. In an embodiment herein, a factory-loaded PSD is modified to contain company-specific information the first time the PSD is presented to the access module 54. Thus, a PSD containing factory-loaded information should not be presented to the access module 54 after the first time and it is an error, or perhaps an attempt at fraud, if this occurs. Accordingly, if it is determined at the test step 65 that it is not a first time for the PSD with factory-loaded information being presented to the access module 54, then control transfers from the test step 65 to the step 64, discussed above, where access is denied. Following the step 64, processing is complete.

If it is determined at the test step 65 that it is a first time that the factory-loaded PSD is being presented to the access module 54, then control transfers from the test step 65 to a step 66 where the PSD is revised to contain a new security mechanism. In an embodiment herein, the security mechanisms may be provided by applications loaded into the PSD. Following the step 66, control transfers to the test step 62, discussed above, where the PSD is authenticated. Thus, note that the system described herein revises the security mechanism in the PSD and, in a corresponding transaction, authenticates the PSD. A user could walk up to an access-controlled door with a factory-loaded PSD and be granted access at the same time. The security mechanism is replaced in way that does not adversely impact the user entering the door. In addition, since the replacement occurs in a single step, the likelihood of incomplete or partial replacement is greatly reduced.

Figure 3:
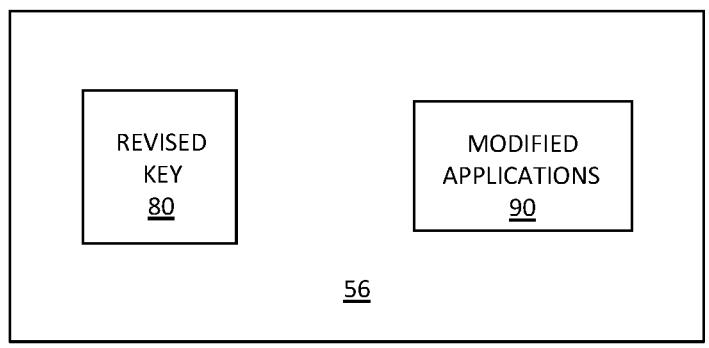
FIG. 3 is a schematic illustration showing a modified PSD according to an embodiment of the system described herein.

FIG. 3 is a schematic illustration showing the PSD 56 as including modified application(s) 90 and possibly a revised key 80. Modifying the application(s) 90 and/or the key 80 provides a custom security mechanism for the PSD 56 so that a malicious user cannot use information from a factory-loaded PSD to circumvent security for a PSD with a custom security mechanism as described herein. The modified application(s) 90 may include any application(s) capable of being provided to the PSD 56.

Figure 4:
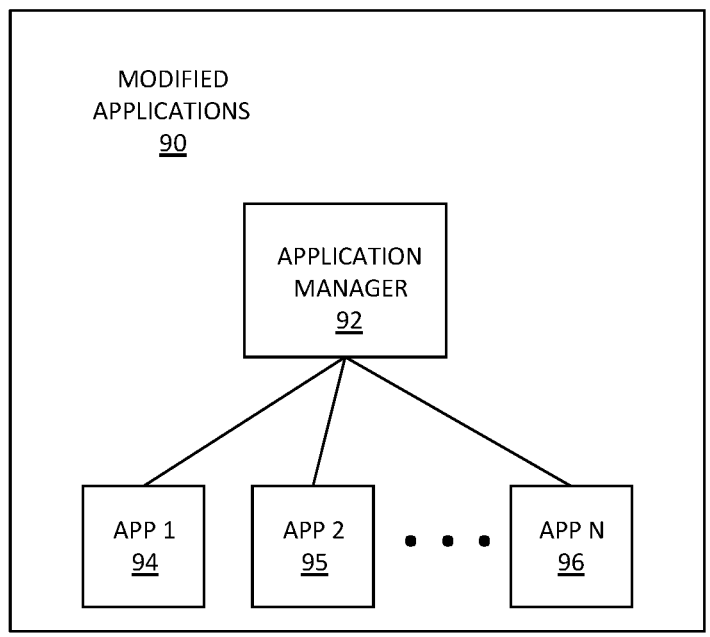
FIG. 4 is a schematic illustration showing modified applications in a PSD according to an embodiment of the system described herein.

FIG. 4 is a schematic illustration showing the modified application(s) 90 in more detail as including an application manager 92 and a plurality of applications 94-96. One or more of the applications 94-96 may provide a security mechanism, such as providing authentication information for egress through controlled doors. In an embodiment herein, at least one of the applications 94-96 is modified in connection with a user first using the PSD for access. The modified one of the applications 94-96 provides a different security mechanism that is used for subsequent accesses by the PSD.

In an embodiment, the system described herein may be used in connection with Seos card technology. Seos is a system of interoperable products and services, produced by Assa Abloy Ab of Stockholm, Sweden, for issuing, delivering and revoking digital keys on near field communication (NFC) mobile devices so that they can be used to open doors to homes, hotels, offices, hospitals, universities, industries and commercial buildings. Seos may be used to send commands, such as a single Application Management Request (AMR) command, to the PSD 56. The AMR command, which is described in ISO/IEC 7816-13, provides for replacing or creating a whole application in a single step. The body of the AMR command combines an application level data objects together with system objects like application name, access rights and access keys in a single constructed object. Another specific embodiment could include a PSD with generic transaction capability which may be provided, for example, using a Java card. Accordingly, although the system described herein is principally discussed in connection with specific types of PSDs, such as a Seos card, it is noted that the system described herein may be used in connection with any appropriate type of PSD.

In some embodiments, it may be desirable to provide privacy-enhanced discovery, selection and authentication of PSD credentials from a terminal, reader or authentication server capable of communicating with a mobile device via a NFC, RF or other type of wired or wireless interface. The PSD may, for example, be a contact or non-contact smart card, USB token, mobile phone, a Bluetooth or Wi-Fi portable device, PDA or similar devices having wired or wireless connection mechanisms to communicate. The system described herein may be built on the basis of authentication protocols with session key establishment such as a ISO 11770-2 mechanism protocol, other authentication protocols found in ISO 24727-6 registry, GlobalPlatform or ANSI GICS, and may provide extensions to allow rapid and private discovery of credentials on the mobile device. In other embodiments, the PSD may be a secure memory storage card that has authentication capabilities and no exposed crypto functions beyond memory access authentication.

The system described herein may be used with a protocol that facilitates confidential discovery and selection of interoperable credentials with privacy, without requiring several separate commands for credential discovery and selection and therefore without requiring significant additional time to conduct the transaction. The privacy-enhanced authentication protocol uses knowledge of a secret to discover access module 54 contexts that the PSD 56 may open or access. Without the possession of the corresponding keys, accessing one credential on the PSD 56 does not breach the privacy of any other credentials on the PSD 56 (including determining if a given credential is or is not on the PSD 56). For further details, reference is made to WO 2013/144719 A1, cited elsewhere herein.

According to the system described herein, a method may be provided to access (e.g. logon or unlock) a secured host device, such as a PC, laptop, tablet and/or other computing device enabled with a SAM, using a PSD, such as a NFC enabled smart card or mobile phone with an embedded SIM or secure element.

In various embodiments, the system described herein may be used in connection with one-time passwords (OTPs) for user authentication. Known implementations of OTP technologies for user authentication include use of a hardware OTP token. Under these implementations a single device (the token) stores the underlying OTP key, generates the OTP and displays the OTP to the user. Other implementations include a mobile OTP token in which these three functions are all executed on a mobile phone or other mobile PSD device. For further details of a known implementation of an authentication system using OTPs, reference is made, for example, to U.S. Pub. No. 2009/0193264 A1 to Fedronic et al., entitled "Authentication System and Method," which is incorporated herein by reference.

Figure 5:
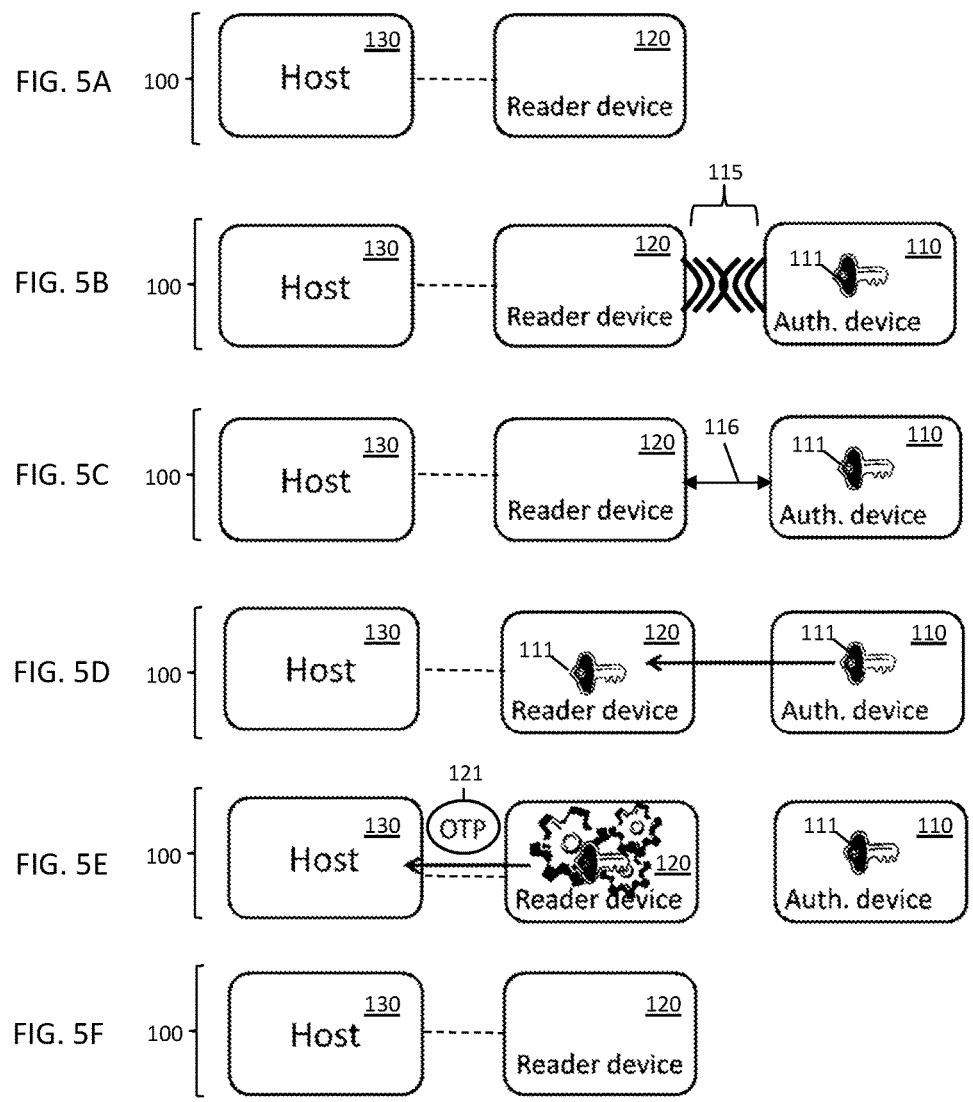
FIGS. 5A-5F are schematic illustrations showing a secure authentication system having a host and a reader device and showing a sequence of interactions of in connection with an access attempt of the host by a user presenting a PSD.

According to the system described herein, an OTP key may be stored on a different device than the device on which the OTP is generated. In an embodiment, the system described herein enables a combined system, including the two separate devices communicating over a non-contact interface, to provide advantageous security features compared to the use of a single device, such as a hardware OTP token. One device may be a PSD and the other device may a reader device. It is noted, however, that although use of a non-contact interface between devices is principally discussed herein, the system described herein may be implemented using contact interfaces, such as interfaces involving swiped access cards. It is also noted that the method described herein does not rely on the PSD crypto capabilities for the OTP generation. This can be a distinct advantage to be able to support a broader range of PSDs that do not have the crypto built in to generate an OTP FIGS. 5A-5F is a schematic illustration showing a secure authentication system having a reader device 120 and a host 130 and showing a sequence of interactions of in connection with an access attempt of the host 130 by a user presenting a PSD, referred to, for example, as an auth(entication) device 110 in the discussion herein. FIG. 5A shows the initial state of the secure authentication system having the reader device 120 and the host 130 to which controlled access is being requested by the user. As further discussed elsewhere herein, in various embodiments, the host may be part of a physical access control system, such as an access-controlled physical door and/or may be a access-controlled computer system, among other suitable access control embodiments. Accordingly, as shown via use of a dashed line between the reader 120 and the host 130, the coupling therebetween may be a secure physical coupling and/or may be secure remote coupling via a network.

FIG. 5B shows presentation of the authentication device within a wireless field of the reader device 120 for a non-contact interface 115 therebetween. An OTP key 111 is stored on the authentication device 110. In an embodiment, the authentication device 110 provides adequate protection for the storage of the OTP key 111 such that the OTP key 111 can only be read by the reader device 120 when it is a trusted reader device. In this way, the system 100 may provide that the authentication device 110 releases the OTP key 111 only to trusted authenticated reader devices.

FIG. 5C shows authentication of the reader 120 to the authentication device 110 and the establishment of a secure channel 116 over the non-contact interface 115 between the reader device 120 and the authentication device 110. The secure channel 116 may be protected such that it is not vulnerable to interception. Suitable encryption and/or other appropriate protocols for authenticating the reader device 120 to the authentication device 110 and for providing the secure channel 116 over the non-contact interface 115 are known (see, e.g., US 2009/0193264 to Fedronic, which is incorporated herein by reference).

FIG. 5D shows transfer of the OTP key 111 from the authentication device 110 to the (trusted) reader device 120 over the non-contact interface 115 via the secure channel 116.

FIG. 5E shows execution of an OTP generation algorithm of the reader device 120. Using the OTP key 111, the reader device generates an OTP 121 using the OTP generation algorithm within a secure environment of the reader device 120. The reader device 121 passes the OTP 121 to the host 130 for validation. A beneficial aspect of the system described herein is that the OTP key 111 is never exposed outside of a secure environment, and thereby the risk of comprising the OTP key 111 is reduced.

FIG. 5F shows that, after validation of the OTP by the host and granting of access by the user thereto, the OTP key 111 may be cleared from the reader device 120, placing the system 100 back into a state like that shown in FIG. 5A.

Figure 6:
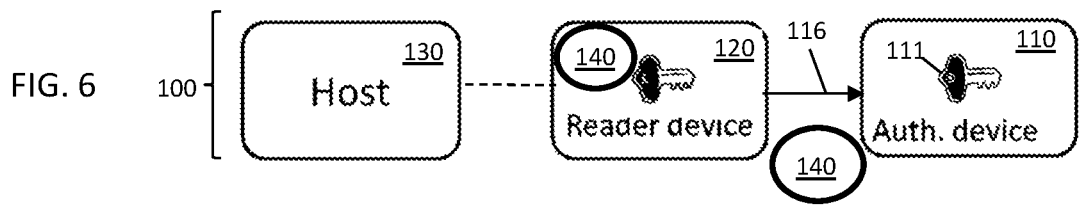
FIG. 6 shows an embodiment for optional processing in which counter data, such as an event counter, is written back to the authentication device.

FIG. 6 shows an embodiment for optional processing in which counter data 140, such as an event counter and/or a moving factor, is written back to the authentication device 110. In an embodiment, this step may be performed after validation processing of the OTP 121 at the host 130, or an external validation system called by or connected to the host, and prior to clearing the OTP key 111 from the reader device 120, namely between the processing shown in FIGS. 5E and 5F. Alternatively and/or additionally, the counter data for the OTP for the specific PSD may be stored at the reader device 120 so that the reader device has effectively a list of counter or moving factor values. This has the advantage that for OTP generation the card may stay in 'read-only' mode since nothing is written back to the authentication device 110.

According to an embodiment, an implementation of the system described herein may leverage a microprocessor based access card as the authentication device 110 and a USB card reader as the reader device 120. The existing capabilities of known access cards and USB card readers provide established proven mechanisms for the storage of an OTP key (on the card) and for a trusted reader to retrieve the OTP key from the card, (as described in connection with the processing shown in FIGS. 5B-5D). The readers may be enhanced to run an on-board OTP algorithm within a secure environment to generate an OTP which could then be passed to the host device 130 for authentication purposes (as described in connection with the processing shown in FIG. 5E).

According to another embodiment, another implementation of the system described herein may leverage an NFC reader and associated secure container embedded within a computing device such as a laptop, tablet or phone, acting as the reader device 120. The secure container may take the form of a Secure Element, a Trusted Platform Module (TPM) or a software based container. A key would be provisioned to the secure container enabling the computing device to authenticate itself to the authentication device 110 (see FIG. 5C). The OTP key would then be passed across the non-contact interface 115 to the secure container. An application or applet running within the secure container may then use the OTP key to generate the OTP for validation by the host 130.

In various embodiments of the system described herein, the authentication device 110 may be an access card pre-loaded with the OTP key 111 at manufacturing. Loading these keys into the a hosted authentication service, would enable this service to verify OTPs generated using the access card. Alternatively, the OTP key 111 may be provisioned to the authentication device 110 (access card) in the field and loaded into an on-site authentication server (see, e.g., WO 2013/144719 A1 to Sechdeva et al., cited elsewhere herein).

In another embodiment, the OTP key 111 may be generated by combining key material stored on the authentication device 110 (access card) with key material stored on the reader device 120. This would create a binding between the access card and reader device and would not allow the card to be used with any other reader device. In some circumstances, however, this technique may has several drawbacks, as for example when a reader device breaks, requiring re-provisioning of the OTP key It is noted that there are a variety of potential implementations of the OTP algorithm discussed herein for generating the OTP 121. Each implementation may take a different approach to introducing a dynamic variable known the host 130, the reader device 120 or both. The dynamic variable may be used as a parameter in the generation of the OTP 121. These implementations are well established, for example the OATH HOTP (see RFC 4226, which is incorporated herein by reference) and TOTP algorithms (see RFC 6238, which is incorporated herein by reference, and see, e.g., US 2009/0193264 A1 to Fedronic et al., which is incorporated herein by reference).

The dynamic variable may be counter data, such as an event counter and/or a moving factor, which is stored on the authentication device 110. The counter data may be passed over the non-contact interface along with the OTP key (see FIG. 5C). The reader device 120 increments the counter data and writes it back to the authentication device 110 (access card) at the end of the sequence (see FIG. 6). In another embodiment the host 130 may store a local copy of the counter data for each authentication device 110 or one counter for all authentication devices and increment it with each successful authentication. In an embodiment, the dynamic variable may be a function of the current time, which can be determined independently by the host 130 and the reader device 120. In another embodiment, the reader device 120 retrieves a random number, often referred to as a nonce, from the host 130 and uses this as the dynamic variable in the generation of the OTP 121.

Figure 7:
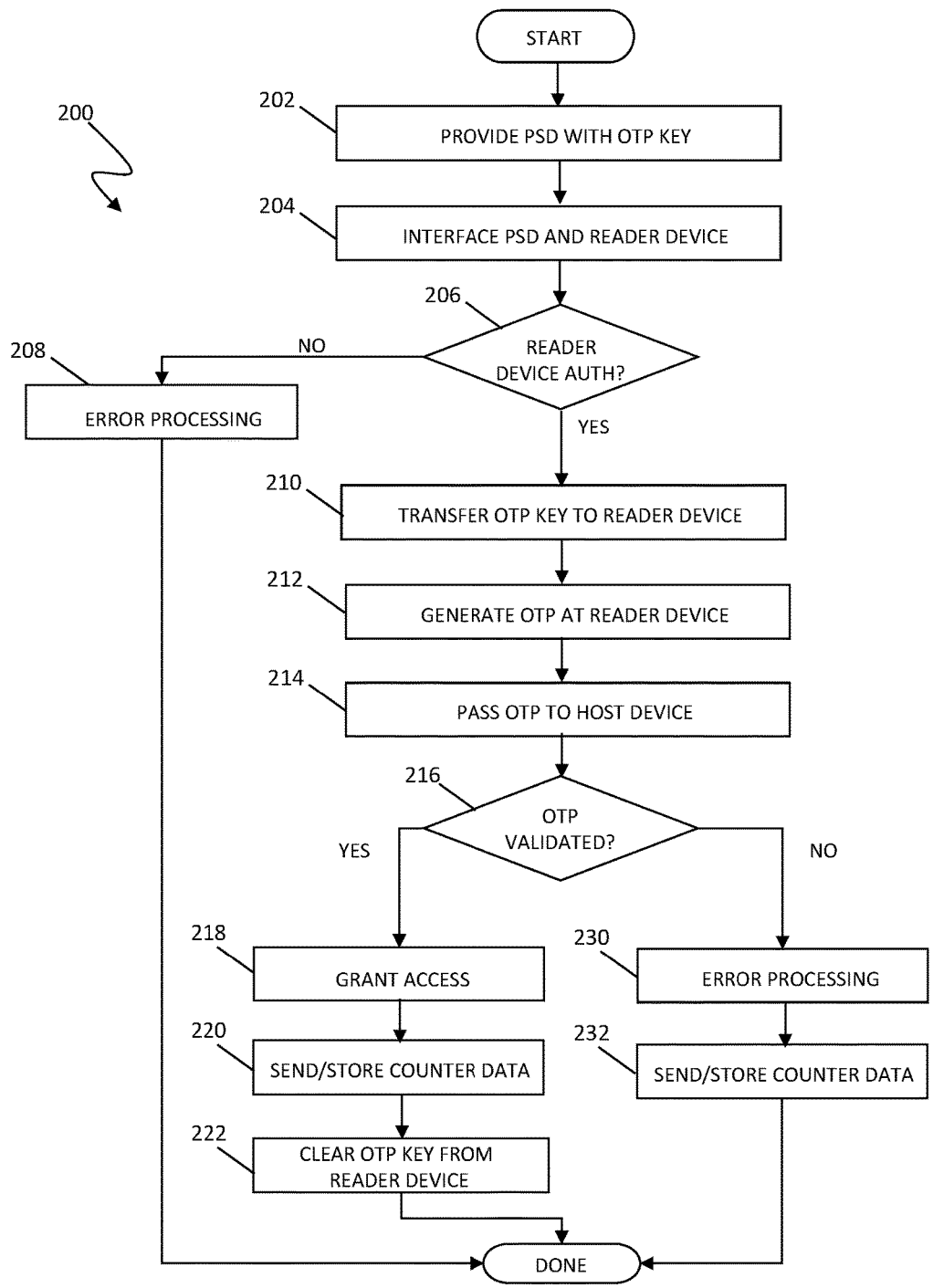
FIG. 7 is a flow diagram showing authentication processing steps according to an embodiment of the system described herein.

FIG. 7 is a flow diagram 200 showing authentication processing according to an embodiment of the system described herein. The authentication processing may be for authenticating a personal security device (PSD) of a user who is attempting to access a secured host device, such as an access-controlled door and/or computer system, and/or accessing remote secured services via a host device. In various embodiments, the PSD may be a smart card, a mobile phone and/or other appropriate portable authentication device. At a step 202, the PSD is provided with a one-time-password (OTP) key. In various embodiments, the PSD may be provided with the OTP key at time of manufacture of when the PSD is in the field. After the step 202, processing proceeds to a step 204 where a reader device, coupled to the host device, interfaces with the PSD. In an embodiment, the interfacing is performed using a non-contact interface when the PSD is presented within the wireless, non-contact field of the reader device. In other embodiments, the reader device may be a device embedded in a sleeve for a tablet/phone and/or a device embedded in the host device itself. After the step 204, processing proceeds to a test step 206 where it is determined whether the reader device is authenticated to the PSD. If not, then processing proceeds to a step 208 where error processing is performed that may include re-attempting authentication, informing the user that authentication cannot be performed and/or performing some other type of authentication. Various techniques for such authentication may be used, as further discussed in detail elsewhere herein. After the step 208, processing is complete for this iteration of the described flow processing.

If, at the test step 206, it is determined that the reader device has been authenticated and is thereby trusted by the PSD and a secure channel has been established between reader device and the PSD, then processing proceeds to a step 210 where the OTP key and optionally the counter data is transferred (copied) from the PSD to the authenticated reader device over the secure channel. According to an embodiment of the system described herein, the OTP key is only readable from the PSD by the reader device when is authenticated and a secure channel is established between the PSD and a reader device.

After the step 210, processing proceeds to a step 212 at which an OTP is generated at the reader device using the OTP key transferred to the reader device from the PSD. After the step 212, processing proceeds to a step 214, where the OTP is passed from the reader device to the secured host device. After the step 214, processing proceeds to a test step 216 where it is determined whether OTP is validated for access to be granted to the user presenting the PSD. In various embodiments, the OTP may be validated at the host device (secure host device) and/or the OTP may be validated elsewhere via the host device. If the OTP is validated at the step 216 then processing proceeds to a step 218 where access is granted. After the step 218, processing may proceed to an optional step 220 where the reader device sends counter data, such as an event counter and/or moving factor (incremented after the read), to the PSD after the access decision and/or, in other embodiments, the reader device may store the counter data. After the step 220 (or after the step 218 if step 220 is not performed) processing proceeds to a step 222 where the OTP key is cleared from the reader device. After the step 222, processing is complete for the described iteration of the authentication processing.

If, at the test step 216, the OTP is not validated, then processing proceeds to a step 230 for error processing, which may include denying access and/or other processing, such as performing additional attempts to validate. After the step 230, processing proceeds to an optional step 232 where the reader device sends the counter data to the PSD after the access decision and/or, in other embodiments, the reader device may store the counter data. After the step 232, processing is complete for the described iteration of the authentication processing. It is noted that in various embodiments, the order of performing the processing for the steps of sending and/or storing the counter data may be appropriately modified in accordance with the system described herein.

Various embodiments discussed herein may be combined with each other in appropriate combinations in connection with the system described herein. Additionally, in some instances, the order of steps in the flow charts, flow diagrams and/or described flow processing may be modified, where appropriate. Further, various aspects of the system described herein may be implemented using software, hardware, a combination of software and hardware and/or other computer-implemented modules or devices having the described features and performing the described functions. The system may further include a display and/or other computer components for providing a suitable interface with other computers and/or with a user. Software implementations of the system described herein may include executable code that is stored in a computer-readable medium and executed by one or more processors. The computer-readable medium may include volatile memory and/or non-volatile memory, and may include, for example, a computer hard drive, ROM, RAM, flash memory, portable computer storage media such as a CD-ROM, a DVD-ROM, a flash drive or other drive with, for example, a universal serial bus (USB) interface, and/or any other appropriate tangible or non-transitory computer-readable medium or computer memory on which executable code may be stored and executed by a processor. The system described herein may be used in connection with any appropriate operating system.

Other embodiments of the invention will be apparent to those skilled in the art from a consideration of the specification or practice of the invention disclosed herein. It is intended that the specification and examples be considered as exemplary only, with the true scope and spirit of the invention being indicated by the following claims.

What is claimed is:

1. A method for access control using a personal security device (PSD) of a user, comprising:
providing the PSD with a one-time-password (OTP) key;
interfacing a reader device, coupled to a host device, with the PSD;
authenticating the reader device to the PSD, wherein the OTP key is only readable from the PSD by the reader device when the reader device is authenticated and a secure channel is established between the PSD and a reader device;
transferring the OTP key from the PSD to the reader device over the secure channel;
generating an OTP at the reader device using the OTP key transferred to the reader device from the PSD;
passing the OTP from the reader device to the host device or a validation system connected to the host device for validation;
sending counter data or incremented counter data from the reader device to the PSD after validation of the OTP; and
clearing the OTP key from the reader device.

2. The method according to claim 1, further comprising:
validating the OTP and granting access to the user.

3. The method according to claim 1, further comprising at least one of:
sending counter data from the PSD to the reader device; or
storing counter data on the reader device before validation of the OTP.

4. The method according to claim 1, wherein the PSD is at least one of: a smart card, a token or a mobile phone.

5. The method according to claim 1, wherein the PSD is a secure memory storage card that has authentication capabilities and no exposed crypto functions beyond memory access authentication.

6. The method according to claim 1, wherein the OTP is generated at the reader device in a secure environment of the reader device.

7. The method according to claim 1, wherein the PSD is provided with the OTP key at a time of manufacture of the PSD or during a field revision of the PSD.

8. The method according to claim 1, wherein the interfacing of the reader device and the PSD is via a non-contact interface.

9. A non-transitory computer readable medium storing software for access control using a personal security device (PSD) of a user, the software comprising:
executable code that stores a one-time-password (OTP) key on the PSD;
executable code that controls interfacing of a reader device, coupled to a host device, with the PSD;
executable code that authenticates the reader device to the PSD, wherein the OTP key is only readable from the PSD by the reader device when the reader device is authenticated and a secure channel is established between the PSD and a reader device;
executable code that transfers the OTP key from the PSD to the reader device over the secure channel;
executable code that generates an OTP at the reader device using the OTP key transferred to the reader device from the PSD;
executable code that passes the OTP from the reader device to the host device or a validation system connected to the host device for validation;
executable code that sends counter data or incremented counter data from the reader device to the PSD after validation of the OTP; and
executable code that clears the OTP key from the reader device.

10. The non-transitory computer readable medium according to claim 9, wherein the software further comprises:
executable code that validates the OTP and grants access to the user.

11. The non-transitory computer readable medium according to claim 9, further comprising at least one of:
executable code that sends counter data from the PSD to the reader device; or
executable code that stores counter data on the reader device before validation of the OTP.

12. The non-transitory computer readable medium according to claim 9, wherein the PSD is at least one of: a smart card, a token or a mobile phone.

13. The non-transitory computer readable medium according to claim 9, wherein the PSD is a secure memory storage card that has authentication capabilities and no exposed crypto functions beyond memory access authentication.

14. The non-transitory computer readable medium according to claim 9, wherein the OTP is generated at the reader device in a secure environment of the reader device.

15. The non-transitory computer readable medium according to claim 9, wherein the PSD is provided with the OTP key at a time of manufacture of the PSD or during a field revision of the PSD.

16. The non-transitory computer readable medium according to claim 9, wherein the interfacing of the reader device and the PSD is via a non-contact interface.

17. A system for access control using a personal security device (PSD) of a user, comprising:
the PSD;
a non-contact field reader device coupled to a host device; and
at least one processor that reads software stored on at least one computer readable medium, the software comprising:
executable code that stores a one-time-password (OTP) key on the PSD;

executable code that controls interfacing of a reader device, coupled to the host device, with the PSD;

executable code that authenticates the reader device to the PSD, wherein the OTP key is only readable from the PSD by the reader device when the reader device is authenticated and a secure channel is established between the PSD and a reader device;

executable code that transfers the OTP key from the PSD to the reader device over the secure channel;

executable code that generates an OTP at the reader device using the OTP key transferred to the reader device from the PSD;

executable code that passes the OTP from the reader device to the host device or a validation system connected to the host device for validation;

executable code that sends counter data or incremented counter data from the reader device to the PSD after validation of the OTP; and executable code that clears the OTP key from the reader device.

18. The system according to claim 17, wherein the software further comprises at least one of:
(i) executable code that validates the OTP and grants access to the user;
(ii) executable code that sends counter data from the PSD to the reader device; or
(iii) executable code that stores counter data on the reader device before validation of the OTP.

* * * * *